United States Patent [19]

Budreau

[11] Patent Number: 4,612,774
[45] Date of Patent: Sep. 23, 1986

[54] ICE COOLED FAN SCREEN APPARATUS AND METHOD

[76] Inventor: Paul A. Budreau, 1505 Valley Ridge, Austin, Tex. 78704

[21] Appl. No.: 755,723

[22] Filed: Jul. 17, 1985

[51] Int. Cl.⁴ .............................................. F25D 3/00
[52] U.S. Cl. ........................................ 62/59; 62/406; 62/420; 62/426
[58] Field of Search .................. 62/59, 430, 434, 406, 62/426, 530, 420–424

[56] References Cited

U.S. PATENT DOCUMENTS

| | | |
|---|---|---|
| 246,781 | 9/1881 | Jennings . |
| 1,081,595 | 12/1913 | Elson . |
| 1,170,658 | 2/1916 | Mitchell . |
| 1,627,361 | 5/1927 | Watt . |
| 1,903,137 | 3/1933 | Reiss . |
| 1,952,414 | 3/1934 | Brizzolara ........................ 62/426 X |
| 2,106,325 | 1/1938 | Kummer . |
| 2,806,362 | 9/1957 | Calkins ............................ 62/434 X |
| 2,841,964 | 7/1958 | Anderson ............................ 62/426 |
| 2,988,901 | 6/1961 | Greene .............................. 62/421 X |

Primary Examiner—Lloyd L. King
Attorney, Agent, or Firm—John N. Shaffer, Jr.

[57] ABSTRACT

Apparatus and method for providing an ice cooled fan screen. The invention is composed of a support frame into the top of which is designed a chamber suitable for holding ice. The chamber has a floor which slopes towards one side of the screen so that melting ice water will collect there. Connected to the floor at the lower end of the chamber is a hollow copper tube which receives the ice water and directs it through a series of "S" turns downward to the base of the support frame. The end of the copper tube has a positive shut off valve so that the ice water may be retained within the tube as long as desired. The base of the support is further designed to provide for a melted ice chamber. Located within this chamber is a removable refreezing tray which is connected to the positive shut off valve by a draining means. As described, the ice cooled fan screen is suitable for placement in front of any common fan to provide for a unique, inexpensive means to substantially cool living, working and playing areas. Another preferred embodiment of the invention is described by placement of an air moving fan within the support frame directly behind the hollow copper tubing. In this configuration, the device is a fully portable, inexpensive cooling means.

8 Claims, 8 Drawing Figures

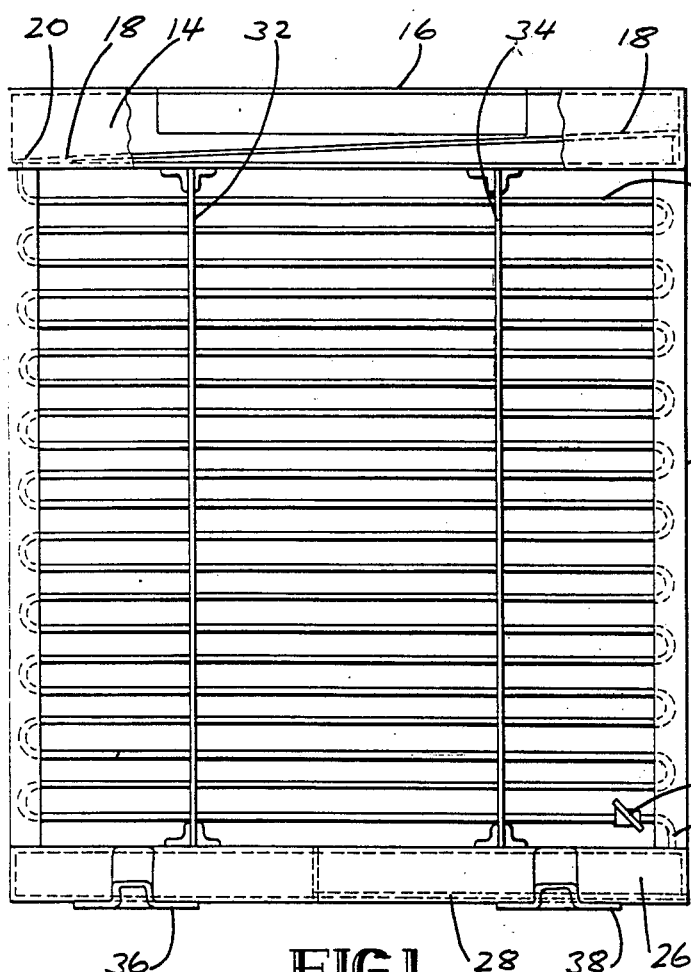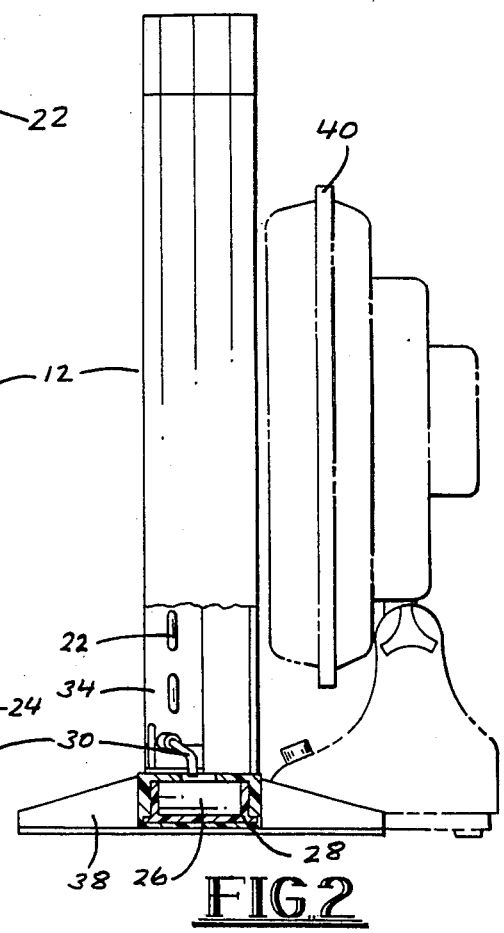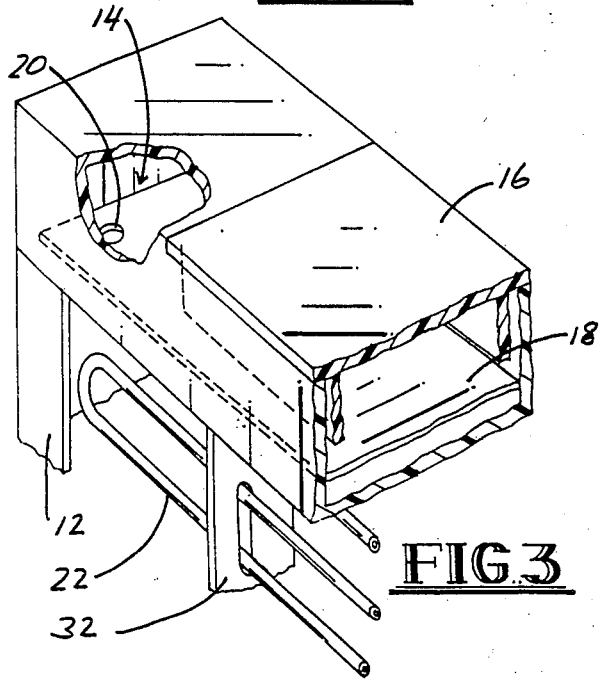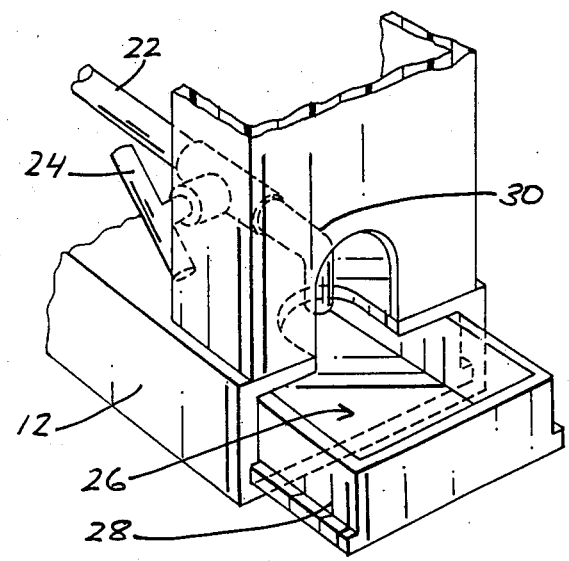

ICE COOLED FAN SCREEN APPARATUS AND METHOD

BACKGROUND OF THE INVENTION

This invention pertains to a device which is designed to provide for an ice cooled fan screen.

While there are numerous types of cooling means, to the best of this inventor's knowledge, there has never been an invention such as this designed to provide for a portable ice cooled fan screen capable of use with or without an auxiliary fan, and that is so designed so that the cooling medium may be refrozen for reutilization in the system. In this inventor's experience, every device that has been designed to provide for an air cooling device utilizing ice has either not been portable, required extensive and expensive machinery to operate, or did not provide for reutilization of the spent ice water. These previous devices were either expensive to produce or mechanically complicated to operate. Additionally, none provided the portability and flexibility of the present device. See cooling devices known in the art exemplified by ELSON U.S. Pat. No. 1,081,595; MITCHELL U.S. Pat. No. 1,170,658; REISS U.S. Pat. No. 1,903,137; WATT U.S. Pat. No. 1,627,361 and KUMMER U.S. Pat. No. 2,106,325. Additionally, previous systems, as exemplified by JENNINGS U.S. Pat. No. 246,781, were susceptible to contamination by mildew and bacteria necessitating replacement of the medium on which the ice water was displaced or time consuming and expensive cleaning was required periodically.

SUMMARY OF THE INVENTION

This invention consists of an ice cooled fan screen. In the preferred embodiment, this ice cooled fan screen is rectangular in shape and is designed for utilization in front of a normal recirculating fan. In use, ice is placed in an ice receiving chamber at the top of the support frame. A sloping copper floor of the chamber is provided to direct the melting ice water to one side of the support frame within the chamber. An exit for the melted ice is provided in the base of the chamber floor at its lowest point, to which is attached a hollow copper tube. The hollow copper tube, formed in a plurality of wide "S" turns, ultimately terminates at the base of the support frame with a positive shut off valve. The presence of the shut off valve enables the user to maintain the ice cooled water within the copper tubing until such time as the cooling effect has reached a minimum. When desiring to "recharge" the system, a user simply opens the positive shut off valve and drains the system into a removeable refreezing tray located within a melted ice chamber formed in the base of the support frame. As a result, previously utilized ice water may be refrozen in the removeable refreezing tray and reutilized as necessary. A pair of removeably attachable ice screen supports are provided to ensure the stability of the screen.

In one embodiment, the device is utilized by placing it in front of an ordinary fan to receive the cooling benefits described above. In another preferred embodiment, the device incorporates a recirculating fan attached to the support frame directly behind the hollow copper tubing. In this embodiment, it is, obviously, not necessary to have a separate air moving fan for proper utilization of the device.

The object of the invention is to provide a device that is easy to set up, repair, maintain, inspect and move. Further the device is, as designed, inexpensive to manufacture, capable of use with or without additional air moving fans, secure in its location by means of removeably attachable frame supports and flexible in its placement. A further object of the device is to provide for an inexpensive means to substantially cool living, working and playing areas. Because the normal household refrigerator is always plugged in and working, the additional energy utilized to freeze the ice for this device will be minimal. Finally the device is easy to clean and sanitary in operation.

BRIEF DESCRIPTION OF THE DRAWINGS

For a description of the construction and operation of the device of this invention, reference is made to the attached drawings and identical reference characters will be utilized to refer to identical or equivalent structures throughout the various views and the following detailed description.

Other objects, features and advantages of the present invention will become more fully apparent from the following detailed description of the preferred embodiment, the appended claims and the accompanying drawings in which:

FIG. 1 is a front view of a preferred embodiment of the ice cooled fan screen of the present invention with the frame of the apparatus being partially broken away to reveal the sloping bottom of the ice holding compartment;

FIG. 2 is a side view of the apparatus partially cut away to reveal the melted ice chamber and ice water receiving tray, as well as a conventional fan located behind the apparatus;

FIG. 3 is a partial sectional view of the top of the apparatus showing the ice holding compartment, sloping bottom of the compartment, the drain therein and the tubing attached thereto;

FIG. 4 is a partial sectional view of the positive shut off valve and the ice water receiving tray;

DETAILED DESCRIPTION

Figure 7:
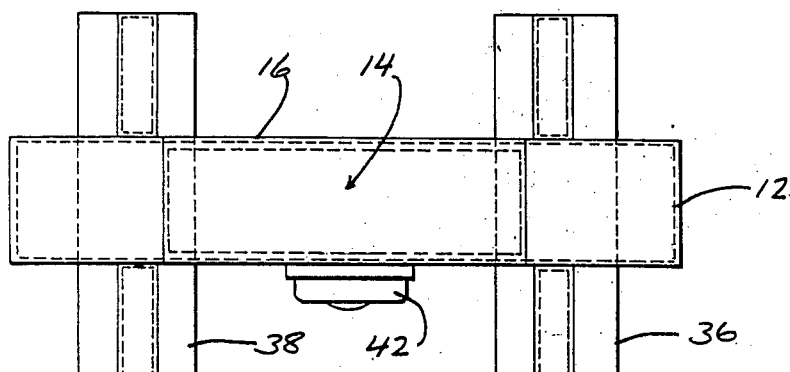
FIG. 7 is a top view of the apparatus with a built in fan.

Referring to FIG. 1, 10 denotes the invention itself consisting of support frame 12 with ice chamber 14 located in the top of the support frame and sealed by moveable sealing top 16. Also illustrated is copper base plate 18 showing its downwardly sloping disposition from one side of support frame 12 to the other. Copper base plate 18, as a result of its slope, directs ice water to ice water receiving means 20 in the lowest end of said copper base plate 18 to which is connected hollow copper tube 22. The end of the hollow copper tube 22 is connected with positive shut off valve 24. Melted ice chamber 26 is provided for in the base of frame 12 within which removeable refreezing tray 28 is located. Ice water draining means 30 connects positive shut off valve 24 to removeable refreezing tray 28 by directing the drained ice water from the positive shut off valve 24 to the removeable refreezing tray 28. An important feature of the invention is that moveable sealing top 16 and removeable refreezing tray 28 are identically shaped and interchangeable. Also illustrated in FIG. 1, are two parallel positioned copper tube support devices 32 and 34 and a pair of removeably attachable ice screen supports 36 and 38.

Referring to FIG. 2, invention 10 is shown in the embodiment wherein a portable fan 40, which is of conventional design known in the art, is utilized in conjunction with invention 10. FIG. 3 details ice chamber 14 with moveable sealing top 16 located at the top of support frame 12. Also shown is downwardly sloping copper base plate 18 and ice water receiving means 20. FIG. 4 is an isolated view of positive shut off valve 24, melted ice chamber 26 and removeable refreezing tray 28. Also shown in FIG. 4 is draining means 30.

Figures 5, 6:
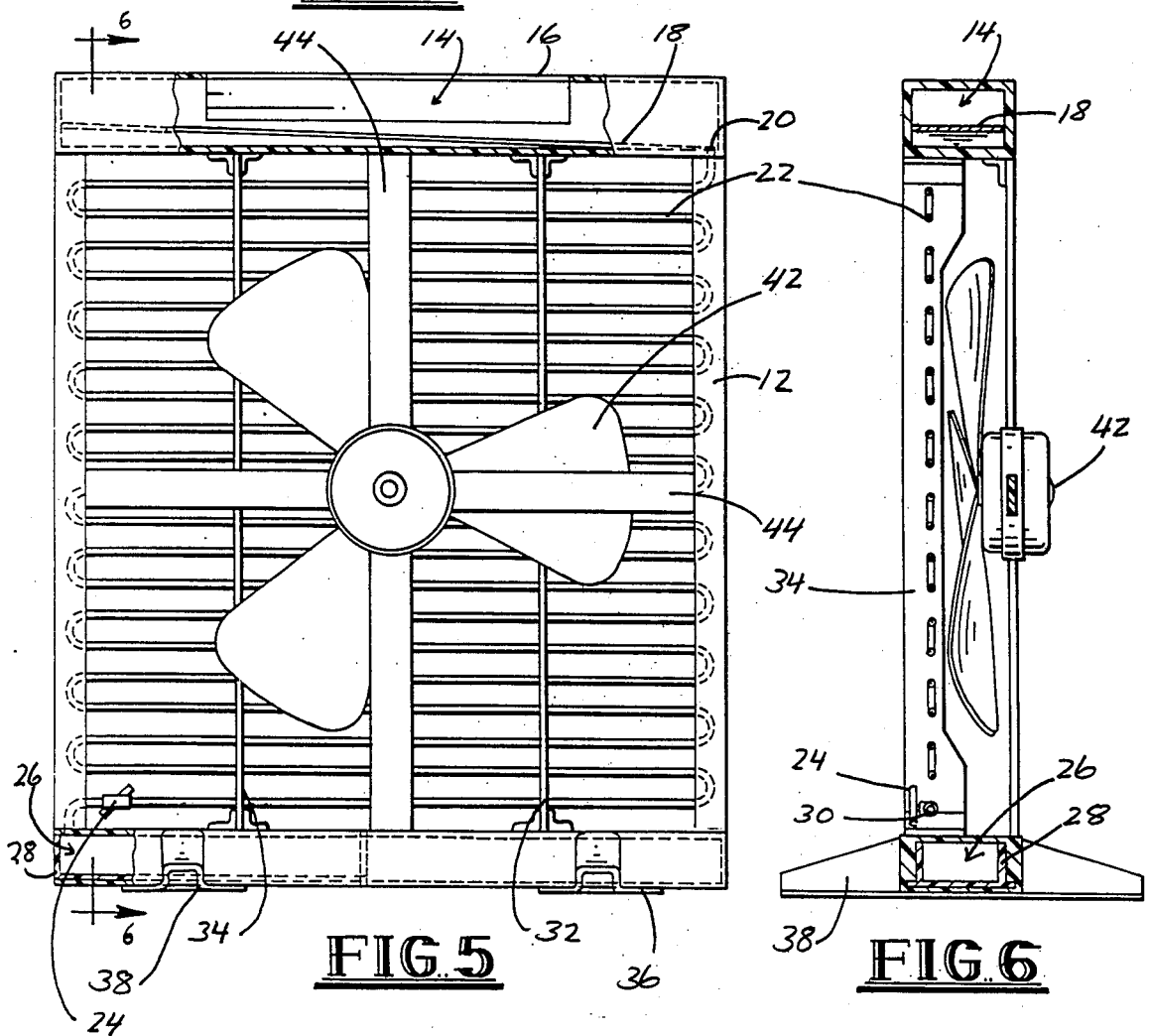
FIG. 5 is a rear view of another preferred embodiment of the ice cooled fan screen with a fan built into the apparatus.
FIG. 6 is a side view taken along the lines 6—6 of FIG. 5.

FIG. 5 illustrates an embodiment of the device wherein fan 42 is built into frame 12. Fan 42 is of conventional design known in the art. Integral fan 42 has fan support members 44 for a retaining the integral fan 42 and position in the middle of and behind copper tubes 22.

Figure 8:
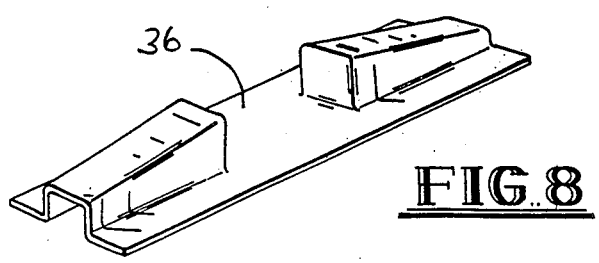
FIG. 8 is a plan view of an ice screen support.

FIG. 6 is a side view of a preferred embodiment of the invention 10 illustrating the invention with an integral fan 42 attached. FIG. 7 is a top view of such an embodiment and FIG. 8 is a view of one of the two removeably attachable screen supports 36.

In use, the device 10 provides for an inexpensive ice cooled fan screen. Support frame 12 holds ice chamber 14 at the top of the device. Moveable sealing top 16 allows introduction of the ice into ice chamber 14. Once introduced, the ice begins to melt and, as it does, flows from the rear of support frame to the front of support frame 12 as a result of the downwardly sloping copper base plate 18 of ice chamber 14. Located at the lowest point of said copper base plate 18 is ice water receiving means 20 to which is attached hollow copper tubing 22. Ice water from ice chamber 14 flows into ice water receiving means 20 and gradually fills hollow tube 22, when positive shut off valve 24 is in the "off" position. When the water in the hollow copper tube 22 ceases to be cold, positive shut off valve 24 may be opened. This results in the water draining through connecting draining means 30 to removeable refreezing tray 28 located in melted ice chamber 26 formed in the base of support frame 12. When removeable refreezing tray 28 is full, it may be removed and placed in a freezing compartment of a refrigerator for reutilization within ice chamber 14. An important feature of the invention is that moveable sealing tray 16 and removeable refreezing tray 28 are identically shaped and interchangeable. As described, the device can be placed in front of a previously acquired air moving fan 40 or, as described in FIG. 5, the device can incorporte air moving fan 44 attached to the back of said support frame 12 directly behind said hollow copper tube 22. Extra stabilization of frame 12 is provided by removeably attachable screen supports 36 and 38.

Thus, according to this invention a portable ice cooled fan screen is provided. Ice from a refrigerator in any form or in the form of the removeable refreezing tray will fit easily into the ice chamber constructed in the top of the free standing support frame. A moveable sealing top is provided to ensure that the ice is retained within said ice chamber and is partially shielded from exterior temperatures. As the ice melts, it will be directed to an ice water receiving means constructed in the lowest portion of a copper base plate for said ice chamber. A hollow copper tube is attached to said ice water receiving means and, with a positive shut off valve located at the end of the hollow copper tube in the "off" position, the hollow copper tube will fill with ice water. In this position, the device is ready for placement in front of the user's own air moving fan or, as previously described, the device can incorporate its own air moving fan attached to the base in back of said support frame directly behind said hollow copper tube. With either the user's own fan or the fan incorporated within the device an inexpensive air conditioning means is provided. Once the water in said hollow copper tube has warmed, the positive shut off valve may be opened to release water into a removeable refreezing tray situated within a melted ice chamber in the base of said support frame. A connecting drainage means directs the water from said shut off valve to said removeable refreezing tray. Once collected, the positive shut off valve will be returned to the off position so that ice cool water will be retained within said hollow copper tube and the removeable refreezing tray can be placed in the freezing compartment of a refrigerator to produce ice for further use in the system. As a result, an inexpensive portable air conditioning means is provided.

While the invention has been described in connection with the preferred embodiment, it is not intended to limit the invention to the particular forms as set forth, but, on the contrary, it is intended to cover alternatives, modifications and equivalents as may be included within the spirit and scope of the invention as defined by the apended claims.

What is claimed is:

1. An ice cooled fan screen apparatus comprising:
    (a) a support frame;
    (b) an ice receiving means mounted on top of said frame;
    (c) a melted ice water transmission means connected to the bottom of said ice receiving means;
    (d) a means for allowing ice water to exit said melted ice water transmission means;
    (e) a melted ice chamber in the base of said support frame;
    (f) a removable refreezing tray located within said melted ice chamber; and
    (g) a draining means connecting said positive shutoff valve to said removable refreezing tray by directing ice water to said removable refreezing tray.

2. Ice cooled fan screen apparatus as recited in claim 1, wherein said ice receiving means includes:
    (a) an ice chamber in the top of said support frame;
    (b) a moveable sealing top for said ice chamber; and
    (c) a copper base base for said ice chamber sloping downwardly from one side of said ice chamber to the other side of said ice chamber.

3. Ice cooled fan screen apparatus as recited in claim 2, wherein said melted ice water transmission means includes:
    (a) an ice water receiving means in the lowest end of said copper base; and
    (b) a hollow copper tube connected to said ice water receiving means.

4. Ice cooled fan screen apparatus as recited in claim 3 wherein said means for allowing water to exit includes a positive shut off valve attached to the lowest end of said hollow copper tube.

5. An ice cooled fan screen apparatus comprising:
    (a) a frame;
    (b) an ice chamber in the top of said support frame;

(c) a moveable sealing top for said ice chamber;

(d) a copper base for said ice chamber sloping downwardly from one side of said support frame to the other side of said support frame;

(e) an ice water receiving means in the lowest end of said copper base;

(f) a hollow copper tube connected to said ice water receiving means;

(g) a positive shut off valve attached to the lowest end of said hollow copper tube;

(h) a melted ice chamber in the base of said support frame;

(i) a removeable refreezing tray located within said melted ice chamber;

(j) a draining means connecting said positive shut off valve to said removeable refreezing tray by directing ice water to said removeable refreezing tray; and (k) two removeably attachable screen supports are provided to stabilize said ice screen.

6. Ice cooled fan screen apparatus as recited in claim 5, wherein an air moving fan is attached to said support frame behind said hollow copper tube.

7. A method for providing an ice cooled fan screen comprising the steps of:

(a) providing a support frame;

(b) attaching an ice chamber in the top of said support frame;

(c) connecting a moveable sealing top to said ice chamber;

(d) attaching a copper base for said ice chamber that slopes downwardly from the one side of said support frame to the other side of said support frame;

(e) constructing an ice water receiving means in the lowest end of said copper base;

(f) connecting a hollow copper tube to said ice water receiving means;

(g) attaching a positive shut off valve to the lowest end of said hollow copper tube;

(h) constructing a melted ice chamber in the base of said support frame;

(i) locating a removeable refreezing tray within said melted ice chamber;

(j) connecting a draining means to said positive shut off valve and to said removeable refreezing tray for directing ice water to said removeable refreezing tray;

(k) providing two removeably attachable screen supports to the base of said frame; and (l) placing said frame in front of an air moving fan.

8. Ice cooled fan screen method as recited in claim 7, wherein an air moving fan is attached to said support frame behind said hollow copper tube.

* * * * *